Figure 1:
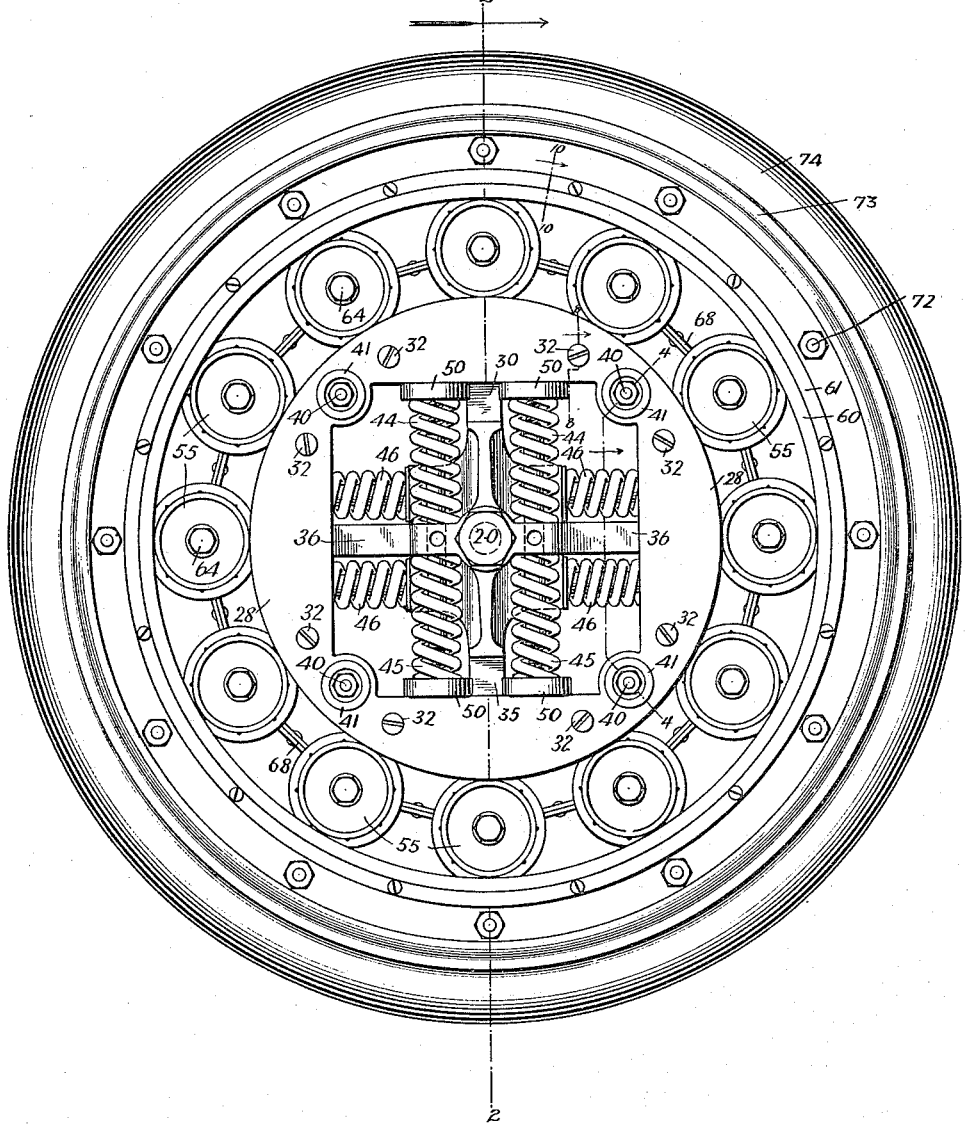

N. CORNFIELD.
VEHICLE WHEEL.
APPLICATION FILED MAR. 9, 1914.

1,163,510.

Patented Dec. 7, 1915.
4 SHEETS—SHEET 1.

WITNESSES

INVENTOR
NOAH CORNFIELD
BY
ATTORNEYS

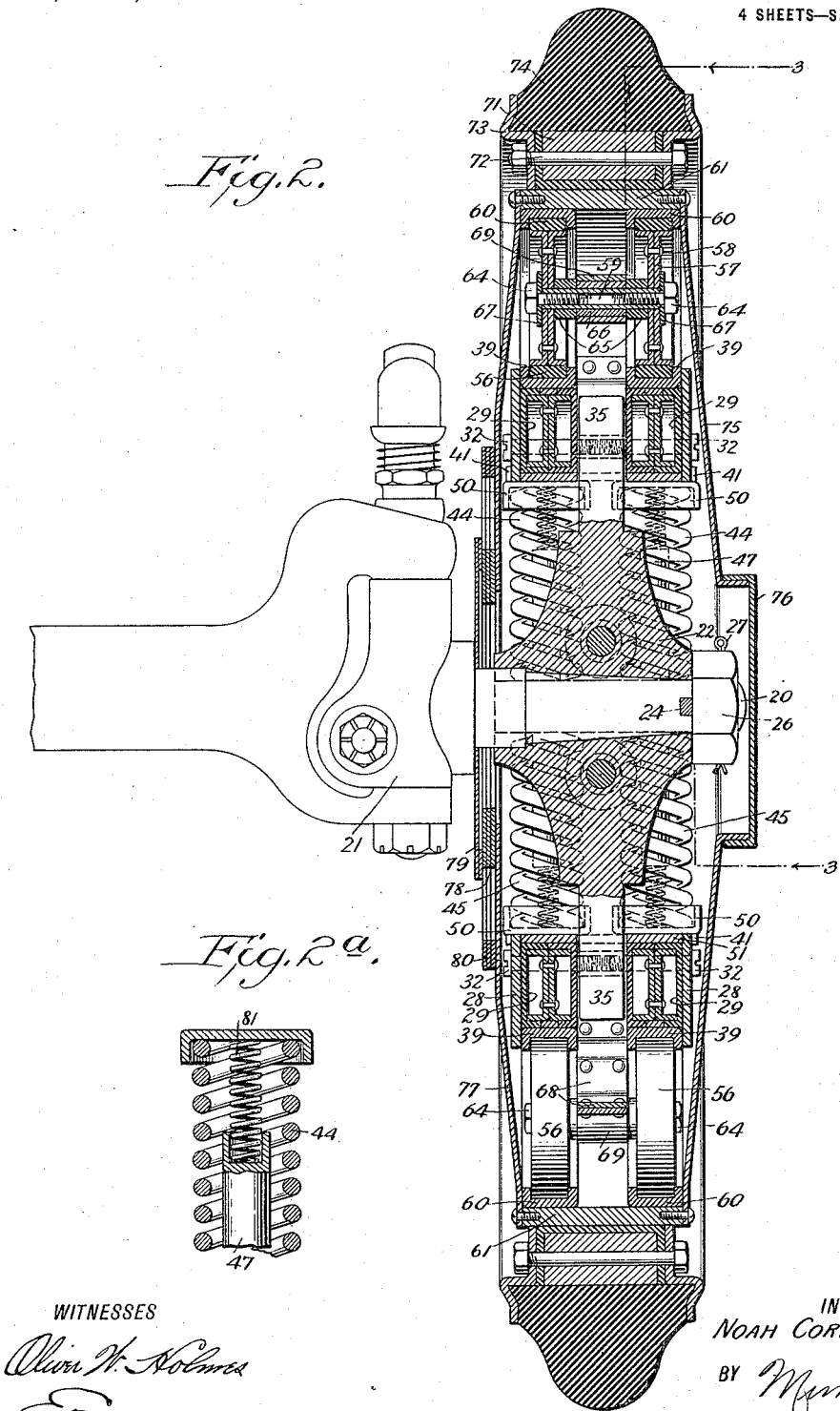

N. CORNFIELD.
VEHICLE WHEEL.
APPLICATION FILED MAR. 9, 1914.
1,163,510.
Patented Dec. 7, 1915.
4 SHEETS—SHEET 3.
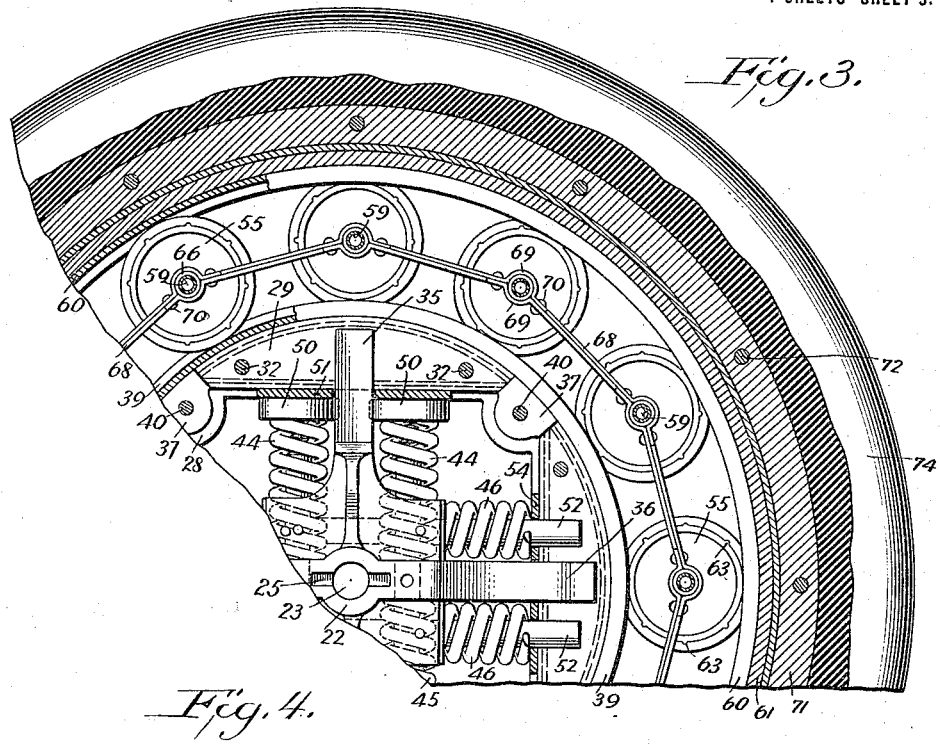
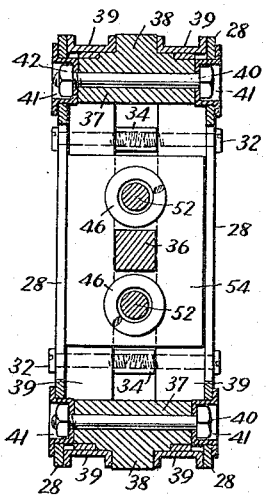
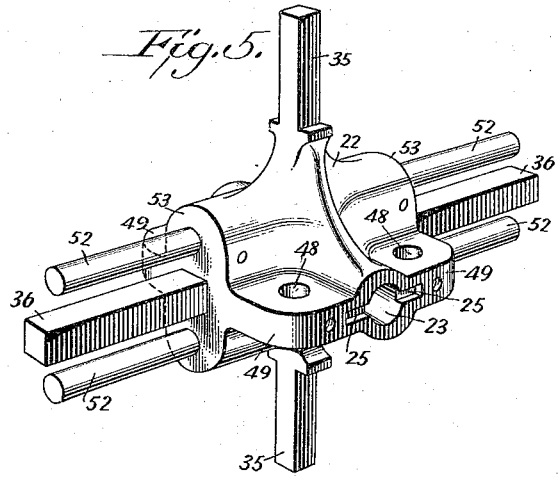
WITNESSES
INVENTOR
NOAH CORNFIELD
BY
ATTORNEYS N. CORNFIELD.
VEHICLE WHEEL.
APPLICATION FILED MAR. 9, 1914.
1,163,510.
Patented Dec. 7, 1915.
4 SHEETS—SHEET 4.
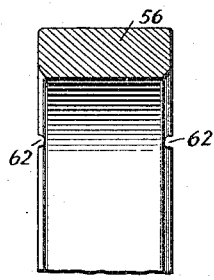
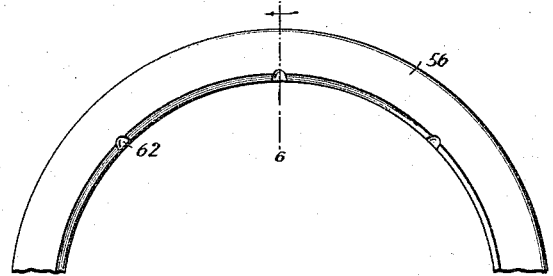
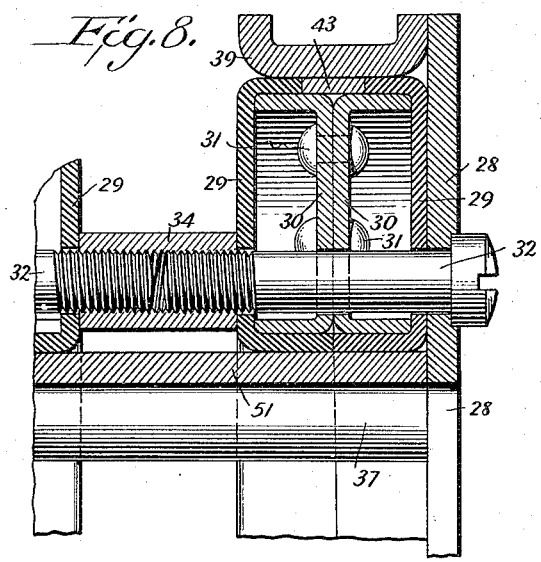
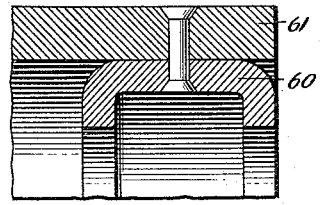
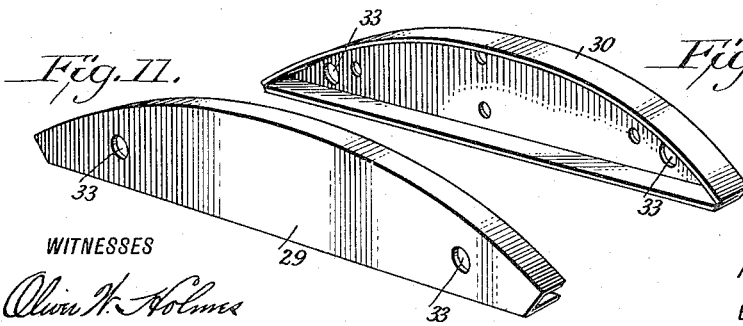
WITNESSES
INVENTOR
NOAH CORNFIELD
BY
ATTORNEYS

UNITED STATES PATENT OFFICE.

NOAH CORNFIELD, OF NEW YORK, N. Y.

VEHICLE-WHEEL.

1,163,510. Specification of Letters Patent. Patented Dec. 7, 1915.

Application filed March 9, 1914. Serial No. 823,538.

*To all whom it may concern:*

Be it known that I, NOAH CORNFIELD, a citizen of the United States, and a resident of the city of New York, borough of Brooklyn, in the county of Kings and State of New York, have invented a new and Improved Vehicle-Wheel, of which the following is a full, clear, and exact description.

Among the principal objects which the present invention has in view are: to maintain the alinement of separately operating elements of the wheel; to minimize the friction between the relatively moving parts; and to strengthen and simplify the construction.

In the drawings, Figure 1 is a side view of a wheel constructed and arranged in accordance with the present invention, the face plate of said wheel being removed; Fig. 2 is a vertical section, on an enlarged scale, taken as on the line 2—2 in Fig. 1; Fig. 2ª is a detail view, on an enlarged scale, of a vertical guide pin and springs controlling the same; Fig. 3 is a detail view of a fragment of a wheel, showing the reduced scale in section as on the line 3—3 in Fig. 2; Fig. 4 is a section taken on the line 4—4 in Fig. 1; Fig. 5 is a detail view in perspective, of the inner hub block of the wheel; Fig. 6 is a cross section of a rim of one of the rollers with which the present wheel is provided; Fig. 7 is a detail view, showing a fragment of one of the roller rims; Fig. 8 is a cross section on an enlarged scale, taken on the line 8—8 in Fig. 1; Fig. 9 is a detail view showing a fragment of one of the tracks provided for the bearing rollers, a portion of the fragment being cut away to show in section the construction thereof; Fig. 10 is a cross section, on an enlarged scale, taken on the line 10—10 in Fig. 1, showing a fragment of the outer track for the bearing rollers; Fig. 11 is a detail view in perspective, of a framing member forming one of the curved segments with which the wheel is provided; Fig. 12 is a detail view in perspective, of one of the filling members for the framing members shown in Fig. 11.

As seen in Fig. 2 of the drawings, a wheel constructed in accordance with the present invention is mounted on an axle 20 extending from a steering knuckle 21 of conventional form. The axle block 22 of the present wheel is provided with a journal bearing 23 to slip over said axle, and is held non-rotatively thereon by a key 24, which in service extends over the hub 20 and rests in slots 25 opening into the journal bearing 23 at the outer end of said block. In service, said block and key are held by a nut 26, which is locked by a cotter pin 27 on the threaded end of said axle.

The hub proper of the present wheel is primarily formed by the cheek plates 28 and hollow segments formed by a plurality of framing members 29 and their filling members 30. The filling members are each provided with edge flanges, one of said flanges being circular, and the other flange being straight, to produce a truss-like construction. When two of the filling members oppositely disposed are backed each against the other, they are structurally united by rivets 31 to reinforce the arch-like construction of the framing members 29. The framing members 29 are held in position by bolts 32, which are extended through perforations formed in the plates 28, and through perforations 33 formed in both the framing members 29 and the filling members 30. The threaded ends of the bolts 32 engage the threads of tapped thimbles 34, said thimbles being employed in part to maintain the spaced relation of said hollow segments, said spaces being provided to receive and guide the extension arms 35 and 36 of the axle block 22.

As seen best in Figs. 11 and 12, the ends of the framing members 29 and the filling members 30 are cut away on lines substantially radial to the completed wheel. The radial surfaces thus produced bear against corner blocks 37, the intermediate exposed surfaces whereof are curved to match the curved flanges of the framing members 29. The corner blocks 37 are each provided with a projection 38 to extend between channel track rings 39, to assist in maintaining the alinement thereof. The rings 39, being thus held interiorly, are held exteriorly by the cheek plates 28, the bolts 32 and 40 performing this office. The bolts 40 pass through perforations disposed lengthwise in the blocks 37 and in cups 41, which are seated in holes provided therefor in the cheek plates 28, as best seen in Fig. 4 of the drawings. The bolts 40 are tightened by nuts 42. The heads of said bolts 40 and the nuts 42 are arranged to sink within the cups 41. The rings 39 are further held in alinement by an annular flange 43, with which each ring is provided. The flange 43, as shown best in Fig. 8 of the drawings, extends between the outer and curved flanges of the members 29, and rests firmly upon the outer and curved flanges of the filling members 30. It will be understood that the flange 43 may be integrally or rigidly formed with, or mounted upon, the rings 39. In the drawings, I have disclosed as the preferred form, the construction wherein the flange 43 is brazed upon the rings 39.

The axle block 22 is normally held in concentric relation to the plates 28 and rings 39 by springs 44, 45 and 46. The springs 44 and 45 are guided by loose pins 47. The pins 47 are loosely mounted in passages 48 formed in horizontal extensions 49 on the axle block 22. The outer ends of the springs 44 and 45 are held in cups 50. The pins 47 are shortened to permit a maximum vertical vibration of the block 22 between the upper and lower slide plates 51 against which the cups 50 rest, and through perforations centrally disposed in which, the arms 35 extend, as shown best in Fig. 3 of the drawings. The springs 46 infold pins 52, which are laterally extended from the block 22, as shown best in Fig. 5 of the drawings, and bear upon the end 53 of the hub block and the slide plates 54. The slide plates 54 are centrally pierced to provide passages for the arms 36. As seen in Figs. 2, 3 and 8, the plates 51 and 54 are guided in their movement on the hollow segments by the edges of the plates 28. The springs 44, 45 and 46 are selected and arranged with reference to the work performed thereby. The major portion of the load being carried by the springs 45, they are constructed from a relatively stronger material. The springs 44 and 45 are arranged in sets of four, while the springs 46 are arranged in sets of two, the latter having relatively lighter work in keeping the hub and wheel connected therewith in working position.

By the arrangement of springs, the circular portion of the hub formed in part by the plates 28, members 29 and 30, and rings 39, is permitted to vibrate or float about the hub block, to yield to the shocks of the road, whether applied to move said hub upward, downward, rearward, or forward, or in any other directions intermediate those named, said springs always operating, when unobstructed, to return said hub to its normal position, where the center of said block is the center of said hub. Further, it will be understood that, while the connecting springs permit the hub to rotate about its center to a limited degree, the normal operative position of said hub is that wherein the plates 54 are perpendicular to the arms 35 and 36. It will also be understood that when a vehicle having wheels as herewith shown and described, is carrying a load, the center of the axle block 22 and the axle mounted therein are not coincident with the center of the hub as formed by said segments, plates and rings.

The hub above described supports an external wheel by means of a train of bearing rollers 55. The rollers 55 are each provided with a felly rim 56. The rim 56 is supported by double-web disks 57. The disks 57 are united by suitable rivets 58, and are centrally perforated to fit an internally-threaded tube 59. The rims 56 are shaped to fit the channel of the track rings 39 and 60, the latter being rigidly mounted upon the felly rim 61 of the above-mentioned wheel. The disks 57 are rigidly connected to the rims 56 by providing indents 62 in the edges of said rims, and striking small tabs 63 into said indents, in the operation of uniting said rims and webs.

The rollers constructed as above described are connected in pairs, being each clamped rigidly to the tubes 59 by bolts 64. The tubes 59 have threaded thereon spacing collars 65 and a sleeve 66. Under the heads of the bolts 64 are spaced washers 67. This construction is best seen in the upper half of Fig. 2 of the drawings. When the bolts 64 are tightened, the rollers held thereby operate as units, the combined sleeve 66 and collars 65 in each pair forming spacing members for the rollers, to fit the track rings 39 and 60. The paired rollers are harnessed by a spacing ring 68. The ring 68 is constructed from a plurality of lapped sections, each having a straight extension and a curved portion 69. The portion 69 in each section is intermediate the ends thereof but adjacent one end thereof. The sections are united by rivets 70 suitably spaced. When thus constructed, a continuous ring is formed, the matched portions 69 whereof infold the sleeves 66 on each pair of rollers, to form bearings for said sleeves and shaft partly formed thereby. In this manner, the rollers 55 are accurately and readily spaced apart. The rims 56 of said rollers are accurately turned to form a neat fit between the track rings 39 and 60. The wheel to which the rings 60 are rigidly connected revolves around the hub above described and about the rollers 55. The felly rim 61 of said wheel rigidly supports said rings 60 and a felly 71. To the felly thus provided are secured, by means of bolts 72, tire clamping plates 73, which in service hold the solid tire 74.

The wheel is faced or protected from dust, at the outer side, by a sheet-metal disk 75. A central opening formed therein, opposite the end of the axle 20, is covered by a cap 76. The inside of the wheel is faced with a similar disk 77, a central opening wherein is covered by sliding plates 78 and 79. The plates 78 are arranged to slide vertically in guides provided by a frame 80. A similar frame is provided on the plate 78 to permit the plate 79 which closely infolds the axle 20, to slide horizontally on said plate 78.

It will be understood that the construction and arrangement of the plates 78 and 79 and the frame 80 may be varied to suit service conditions, as, for instance when the wheels are provided with transmission driving members which, in service, are usually secured to the disk 77.

The pins 47, as above stated, are loosely mounted in the passages 48, and are held in the central position by light springs 81, as shown best in Fig. 2ª.

Claims:

1. A wheel, embodying a non-rotatable axle block provided with oppositely-faced and perpendicularly-arranged bearing surfaces, said block having a plurality of guide arms extending therefrom in perpendicular arrangement to said surfaces; a hub having a rectilineal central opening surrounding said block and provided with framing members spaced apart to receive, and form guides for, said arms; springs disposed between said block and said hub to mutually support the same and permit rectilineal movement thereof; a plurality of rolling members mounted on, to circumvolve, said hub; a felly rim circumfolding said rolling members in contactual relation therewith; and means connecting said rolling members to maintain a spaced relation thereof.

2. A wheel embodying a non-rotatable axle block provided with oppositely-faced and perpendicularly-arranged bearing surfaces, said block having a plurality of guide arms extending therefrom in perpendicular arrangement to said surfaces; a hub having a rectilineal central opening surrounding said block and provided with framing members spaced apart to receive and form guides for said arms; a plurality of track rings mounted on said framing members; springs disposed between said block and said hub to mutually support the same and permit rectilineal movement thereof; a plurality of rolling members mounted on said track rings to circumvolve the same; a felly rim circumfolding said rolling members in contactual relation therewith; and means connecting said rolling members to maintain a spaced relation thereof.

3. A wheel embodying a non-rotatable axle block; a circular hub surrounding said block in guided relation thereto; springs disposed between said block and said hub, to mutually support the same and permit rectilineal movement thereof; a plurality of paired bearing rollers mounted on said hub to circumvolve the same; a spacing ring having rigid body sections and curved portions to form bearings for the axle connecting said wheels; and a felly rim circumfolding said rolling members in contactual relation therewith.

4. In a wheel as characterized, having a rolling felly rim and supporting rollers therefor; a hub, comprising a plurality of segments composed of framing members having each a vertical side, a straight interior flange, and a curved exterior flange, said exterior flanges forming, when united, a complete circle, and said interior flanges forming the sides of a rectangular central opening in said hub; a plurality of cheek plates shaped to conform to said segments, when united; spacing members disposed between said segments to maintain the alinement thereof; and fastening devices for holding said segments, spacing members and cheek plates in service relation.

5. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; a plurality of outwardly channeled track rings to circumfold said segments; and means for structurally uniting said rings and segments.

6. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; a plurality of outwardly-channeled track rings to circumfold said segments; and corner blocks extending between said segments, said blocks having projections to extend between said rings, to maintain the spaced relation of said rings and segments.

7. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; and a plurality of outwardly channeled track rings to circumfold said segments, said rings being provided with a flange to extend between said curved flanges of said segments.

8. In a wheel as characterized, having a rolling felly rim and supporting rollers therefor; a hub, comprising a plurality of truss segments, each having two internally channeled framing members and an I-shaped filling member therefor, the interior flanges of said framing members and filling members being curved to form, when said segments are united, a complete circle; a plurality of outwardly channeled track rings to circumfold said segments; corner blocks extending between said segments, said blocks having projections to extend between said rings, to maintain the spaced relation of said rings and segments; a plurality of cheek plates exteriorly shaped to conform to the perimeter of said rings, and interiorly shaped to conform to the rectangular central opening formed by said segments; and fasteners uniting said plates and blocks.

9. In a wheel as characterized, having a rolling felly rim and supporting rollers therefor; a hub, comprising a plurality of truss segments, each having two internally channeled framing members and an I-shaped filling member therefor, the interior flanges of said framing members and filling members being curved to form, when said segments are united, a complete circle; a plurality of outwardly-channeled track rings to circumfold said segments, corner blocks extending between said segments, said blocks having projections to extend between said rings, to maintain the spaced relation of said rings and segments; a plurality of cheek plates exteriorly shaped to conform to the perimeter of said rings, and interiorly shaped to conform to the rectangular central opening formed by said segments; and fasteners uniting said plates and blocks, said fasteners embodying a plurality of bolts and socket cups extending through said plates to receive said bolts.

10. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; a plurality of outwardly-channeled track rings circumfolding said segments; corner blocks extending between said segments, said blocks having projections to extend between said rings, to maintain the spaced relation of said rings and segments; an axle block having an axle bearing centrally formed therein and a plurality of guide arms extending therefrom, said arms being extended in the same plane in relatively perpendicular arrangement, the ends of said arms extending between said segments, to be guided thereby; and a plurality of supporting springs interposed between said axle block and said segments to bear against the straight flanges thereof.

11. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; a plurality of outwardly channeled track rings circumfolding said segments; corner blocks extending between said segments, said blocks having projections extending between said rings, to maintain the spaced relation of said rings and segments; an axle block having an axle bearing centrally formed therein and a plurality of guide arms extending therefrom, said arms being extended in the same plane in relatively perpendicular arrangement, the ends of said arms extending between said segments, to be guided thereby; a plurality of supporting springs interposed between said axle block and said segments, to bear against the straight flanges thereof; and a plurality of sliding plates having perforations therein to receive said guide arms, and forming bearing members for said springs.

12. In a wheel as characterized, having a rolling felly rim and supporting rollers therefor; a hub, comprising a plurality of truss segments, each having two internally channeled framing members and an I-shaped filling member therefor, the exterior flanges of said framing members and filling members being curved to form, when said segments are united, a complete circle; a plurality of outwardly channeled track rings circumfolding said segments, corner blocks extending between said segments, said blocks having projections extending between said rings, to maintain the spaced relation of said rings and segments; an axle block having an axle bearing centrally formed therein and a plurality of guide arms extending therefrom, said arms extending in the same plane in relatively perpendicular arrangement, the ends of said arms extending between said segments, to be guided thereby; a plurality of supporting springs interposed between said axle block and said segments, to bear against the straight flanges thereof; a plurality of sliding plates having perforations therein to receive said guide arms, and forming bearing members for said springs; a plurality of guide pins for said springs, loosely held therein; and a plurality of supporting springs for said pins, extending between the ends thereof and said plates.

In testimony whereof I have signed my name to this specification in the presence of two subscribing witnesses.

NOAH CORNFIELD.

Witnesses:
E. F. MURDOCK,
PHILIP D. ROLLHAUS.

Copies of this patent may be obtained for five cents each, by addressing the "Commissioner of Patents, Washington, D. C."